(12) United States Patent
Sanders et al.

(10) Patent No.: US 7,967,240 B2
(45) Date of Patent: Jun. 28, 2011

(54) FORMED STRUCTURAL ASSEMBLY AND ASSOCIATED PREFORM AND METHOD

(75) Inventors: Daniel G. Sanders, Sumner, WA (US); David W. Foutch, Seattle, WA (US); Jeff D. Will, Renton, WA (US); Luis Leon, Federal Way, WA (US); Gregory L. Ramsey, Seabeck, WA (US); Garry A. Booker, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 11/687,244

(22) Filed: Mar. 16, 2007

(65) Prior Publication Data

US 2007/0175968 A1    Aug. 2, 2007

Related U.S. Application Data

(62) Division of application No. 10/970,151, filed on Oct. 21, 2004, now Pat. No. 7,210,611.

(51) Int. Cl.
*B64D 33/02* (2006.01)

(52) U.S. Cl. ..................................... 244/53 B; 123/41.7

(58) Field of Classification Search ........................ None
See application file for complete search history.

(56) References Cited

U.S. PATENT DOCUMENTS

| 3,927,817 | A |   | 12/1975 | Hamilton et al. |
|---|---|---|---|---|
| 4,087,037 | A |   | 5/1978 | Schier et al. |
| 4,117,970 | A |   | 10/1978 | Hamilton et al. |
| 4,181,000 | A |   | 1/1980 | Hamilton et al. |
| 4,197,978 | A | * | 4/1980 | Kasper ......................... 228/173.2 |
| 4,217,397 | A |   | 8/1980 | Hayase et al. |
| 4,294,419 | A |   | 10/1981 | Fouse et al. |
| 4,304,821 | A |   | 12/1981 | Hayase et al. |
| 4,603,089 | A |   | 7/1986 | Bampton |

(Continued)

FOREIGN PATENT DOCUMENTS

EP         0 507 067 A    10/1992

(Continued)

OTHER PUBLICATIONS

Chandra, N. and Kannan, D.; Superplastic Sheet Metal Forming of a Generalized Cup Part II: Nonuniform Thinning; 1992; Journal of Mechanical Engineering and Preformance; vol. 1(6); pp. 813-822.*

*Primary Examiner* — Timothy M Speer
*Assistant Examiner* — Adam C Krupicka
(74) *Attorney, Agent, or Firm* — Alston & Bird LLP

(57) ABSTRACT

A superplastically formed structural assembly is provided, as is an associated preform and method for forming such an assembly. The assembly includes a skin member and a support member that are joined to define a space between the members and between the joints. The assembly can be produced by joining the members in a flat configuration, and then forming the resulting preform to a predetermined shape of the structural assembly. The support member defines at least one aperture in communication with the space between the members. Thus, the skin member can be formed by delivering a pressurized fluid through the support member to the skin member, e.g., to superplastically form the skin member against a die that defines a contour surface corresponding in shape to the predetermined configuration of the assembly. The support member can extend in a substantially direct configuration between opposing portions of the skin member.

10 Claims, 5 Drawing Sheets

U.S. PATENT DOCUMENTS

| | | | |
|---|---|---|---|
| 4,622,445 A | 11/1986 | Matsen | |
| 4,811,890 A | 3/1989 | Dowling et al. | |
| 5,118,026 A | 6/1992 | Stacher | |
| 5,410,132 A | 4/1995 | Gregg et al. | |
| 5,420,400 A | 5/1995 | Matsen | |
| 5,460,317 A | 10/1995 | Thomas et al. | |
| 5,683,608 A | 11/1997 | Matsen et al. | |
| 5,700,995 A | 12/1997 | Matsen | |
| 5,705,794 A | 1/1998 | Gillespie et al. | |
| 5,714,233 A | 2/1998 | Suzuki et al. | |
| 5,890,285 A | 4/1999 | Pruitt et al. | |
| RE36,215 E * | 6/1999 | Rosenthal | 244/134 B |
| 5,914,064 A | 6/1999 | Gillespie et al. | |
| 5,994,666 A | 11/1999 | Buldhaupt et al. | |
| 6,051,325 A | 4/2000 | Talwar et al. | |
| 6,077,885 A * | 6/2000 | Hager et al. | 523/445 |
| 6,119,978 A * | 9/2000 | Kobayashi et al. | 244/35 R |
| 6,180,932 B1 | 1/2001 | Matsen et al. | |
| 6,337,471 B1 | 1/2002 | Kistner et al. | |
| 6,371,411 B1 | 4/2002 | Breer et al. | |
| 6,457,676 B1 | 10/2002 | Breer et al. | |
| 6,528,771 B1 | 3/2003 | Matsen et al. | |
| 6,537,682 B2 | 3/2003 | Colligan | |
| 6,566,635 B1 | 5/2003 | Matsen et al. | |
| 6,568,582 B2 | 5/2003 | Colligan | |
| 2002/0179688 A1 | 12/2002 | Sanders | |
| 2003/0155407 A1 | 8/2003 | Yajima | |
| 2005/0121498 A1 | 6/2005 | Franchet et al. | |
| 2005/0218193 A1 | 10/2005 | Comley et al. | |
| 2006/0249560 A1 | 11/2006 | Pitt et al. | |

FOREIGN PATENT DOCUMENTS

EP     1 332 828 A     8/2003

* cited by examiner

FORMED STRUCTURAL ASSEMBLY AND ASSOCIATED PREFORM AND METHOD

CROSS REFERENCE TO RELATED APPLICATION

This application is a divisional of U.S. patent application Ser. No. 10/970,151, filed Oct. 21, 2004 now U.S. Pat. No. 7,210,611 which is hereby incorporated herein in its entirety by reference.

BACKGROUND OF THE INVENTION

1. Field of the invention

The present invention relates to the forming of structural assemblies and, more particularly, relates to a method and preform for forming a structural assembly that defines at least one formed skin member and at least one support member.

2. Description of Related Art

Various methods are known for manufacturing structural assemblies having contoured configurations. According to one conventional method of manufacture, a structural assembly is produced by first forming a number of structural members and then assembling the structural members. Each of the structural members can be formed to a shape that defines a portion of the assembly, and, in this way, the structural members can be assembled to define a shape in combination that would be difficult or impossible to form as a single member. For example, in one typical method of forming the inlet of a nacelle of an aircraft engine, several portions that define the cross-section shape of the inlet are formed, e.g., by superplastic forming, and the separate portions are then assembled circumferentially so that each portion defines a portion of the inlet.

In some cases, it is desirable to form a part as a single assembly so that multiple members do not have to be connected after forming. For example, parts used in some aerospace applications require specific aerodynamic characteristics. In particular, the smoothness of parts defining the outer surfaces of aircraft and other vehicles can affect the flow of air around the aircraft. For example, if the leading edge of an engine nacelle or other body portion of an aircraft is formed of multiple members, the interfaces of the members may disrupt the flow of air around the aircraft, thereby potentially affecting the performance and efficiency of the aircraft.

Thus, there exists a need for an improved method for forming structural assemblies and an associated preform and assembly. The method should be capable of forming a variety of desired contours, and should be capable of forming the assembly with a smooth other surface as desired for some applications. In addition, the method should be compatible with materials such as titanium.

SUMMARY OF THE INVENTION

The present invention provides a method for forming a structural assembly, and an associated preform and structural assembly. The method includes joining a skin member and a support member to form a preform with a configuration corresponding to a predetermined configuration of the structural assembly, and providing a pressurized fluid to superplastically form the skin member to a contour of the structural assembly, e.g., against a die that defines a contour surface corresponding in shape to the predetermined configuration of the assembly. In particular, the fluid is delivered through at least one aperture in the support member to the skin member such that, after forming, the support member extends in a substantially direct configuration between opposing portions of the skin member. In some cases, the support member is also formed, e.g., by stretching the support member by at least about 5%.

Each of the skin and support members can be formed of various materials including titanium. The members can be provided in a substantially flat configuration and joined in the substantially flat configuration. In some cases, the thickness of the members can be selectively reduced, e.g., by chemical milling, to facilitate forming. The connection between the members can be formed by laser welding, friction stir welding, resistance welding, diffusion bonding, or the like. In particular, first and second joints can be formed between the skin and support members so that the preform defines a space between the members and between the joints, and at least one of the apertures through the support member is in fluid communication with the space. The joints can extend annularly so that the space also extends annularly between the joints. In some cases, each joint can define a nonuniform curve, such as a sinusoidal pattern.

A structural assembly formed according to one embodiment of the present invention includes a skin member that defines an annular space, and a support member joined to the skin member by first and second annular joints. The first joint extends annularly proximate to an outer periphery of the annular space, and the second joint extends annularly proximate to an inner periphery of the space. Each joint can be circular or can define an annularly-extending sinusoidal pattern. The support member extends in a substantially direct configuration between the opposing portions of the skin member so that the space is defined between the skin and support members and between the first and second joints. The support member defines a plurality of apertures that extend to the annular space. For example, the skin member can define an inlet of an engine nacelle, and the support member can define a bulkhead within the inlet. Similarly, an airfoil for structures such as an aircraft wing, horizontal stabilizer, aircraft rudder, missile fin, helicopter blade, racecar spoiler, submarine or boat rudder, jet engine, turbine fan blade, or the like can be fabricated. The members can be formed of titanium or other materials, and each of the members can be a unitary member.

The present invention also provides a preform for forming a structural assembly. The preform includes a substantially flat skin member and a substantially flat support member joined to the skin member by first and second annular joints. The first joint is disposed radially outside the second joint so that the joints define an annular space between the members. The support member defines a plurality of apertures extending to the annular space so that the skin member is configured to be formed by delivering a pressurized fluid through the apertures. Each of the members can be a circular portion that defines a hole through the preform.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Figure 1:
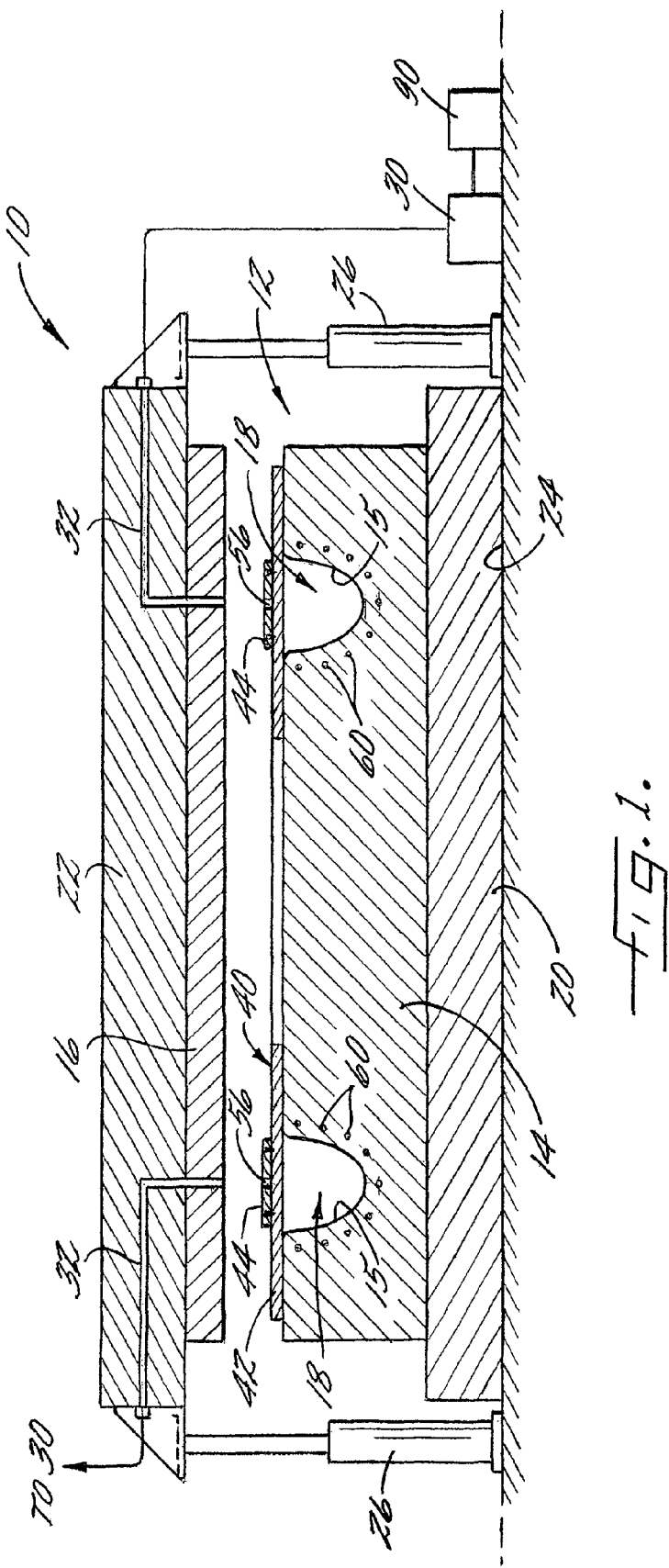
FIG. 1 is a section view illustrating a system for forming a structural assembly according to one embodiment of the present invention.
Figure 8:
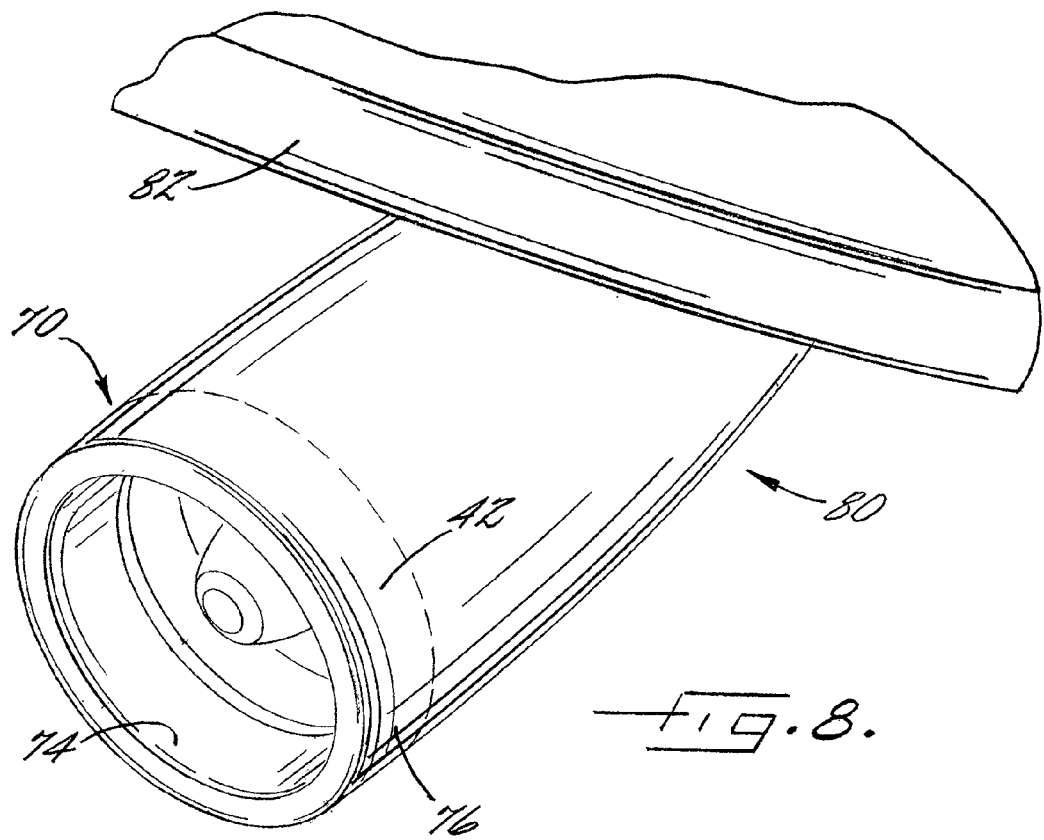
FIG. 8 is a perspective view illustrating a nacelle of an aircraft engine and a wing of an aircraft formed according to one embodiment of the present invention.
Figure 9:
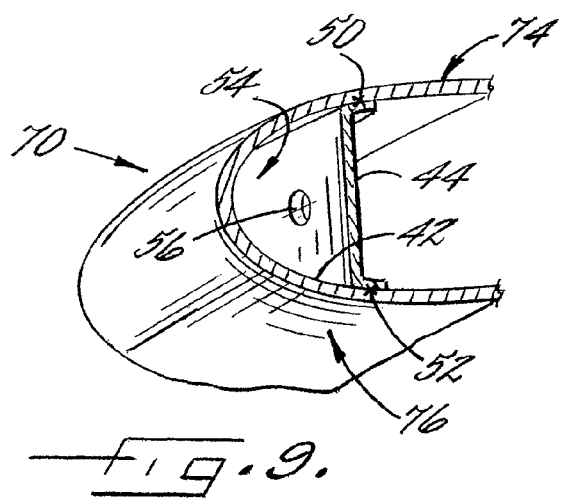
FIG. 9 is a partial perspective view illustrating a structural assembly formed according to one embodiment of the present invention.

Referring now to the drawings, and in particular to FIG. 1, a system 10 for forming a structural assembly uses a preform according to one embodiment of the present invention. In particular, the preform 40 illustrated in FIGS. 3 and 4 can be used to form the structural assembly 70 that is illustrated in FIGS. 8 and 9. The structural assemblies according to the present invention can define various contours and configurations. In particular, the structural assemblies can define curved contours associated with superplastic forming. The structural assemblies can be used in a variety of industries and applications including, but not limited, in connection with the manufacture of aircraft and other aerospace structures and vehicles. Further, the structural assemblies can be used individually or in combination with other structures and devices. In particular, the structural assembly 70 shown in FIG. 8 is an inlet of a nacelle 80 of an aircraft engine.

The system 10 illustrated in FIG. 1 includes a die set 12 having first and second dies 14, 16, which cooperatively define a die cavity 18. The die set 12 is configured to be adjusted between open and closed positions so that the die cavity 18 can be opened to receive the preform 40 and then closed during the forming operation. For example, the second die 16 can be lifted from the first die 14, or the first die 14 can be lowered relative to the second die 16. In other embodiments of the present invention, the dies 14, 16 can be configured in a horizontal configuration such that one or both of the dies 14, 16 can be moved horizontally to open the die cavity 18. Support structures 20, 22 can be provided for supporting the die set 12 and adjusting the die set 12 between the open and closed positions. For example, the first and second dies 14, 16 can be connected to the first and second support structures 20, 22, respectively. The first support structure 20 can be supported on a foundation 24 or other surface, and the second support structure 22 can be configured to be adjusted by actuators 26 that are hydraulic, pneumatic, electric, or otherwise powered. Thus, as the actuators 26 extend, the second support structure 22 and, hence, the second die 16 is lifted to open the die cavity 18. As the actuators 26 retract, the second support structure 22 and the second die 16 are lowered to close the die cavity 18. The system 10 can be secured in the closed position by the actuators 26 or otherwise so that the die cavity 18 is closed and sealed during a forming operation while internal pressures are achieved in the die cavity 18.

The system 10 can also include a source 30 of pressurized fluid, which can be a vessel that contains pressurized fluid, a compressor device for pressurizing fluid, or the like. The source 30 is typically configured to provide a pressurized inert gas, such as argon, though other fluids can also be used. The source 30 is fluidly connected to the die cavity 18, e.g., via one or more gas passages 32 extending through the system 10 to the cavity 18.

The dies 14, 16 can be formed of a variety of materials including, e.g., ceramic, metals, and the like. For example, in the embodiment illustrated in FIG. 1, the first die 14 is formed of a cast ceramic with a low thermal expansion and a high thermal insulation. The second die 16 is formed of a high temperature alloy of stainless steel. The additional support structures 20, 22 can also be provided to maintain the shape of the dies 14, 16 and prevent damage to the dies during operation and handling, such as is described in U.S. Pat. No. 5,683,608, entitled "Ceramic Die for Induction Heating Work Cells," which issued on Nov. 4, 1997, and U.S. Pat. No. 6,528,771, entitled "System and Method for Controlling an Induction Heating Process," which issued Mar. 4, 2003, both of which are assigned to the assignee of the present invention, and the entirety of each of which is incorporated herein by reference.

Figure 2:
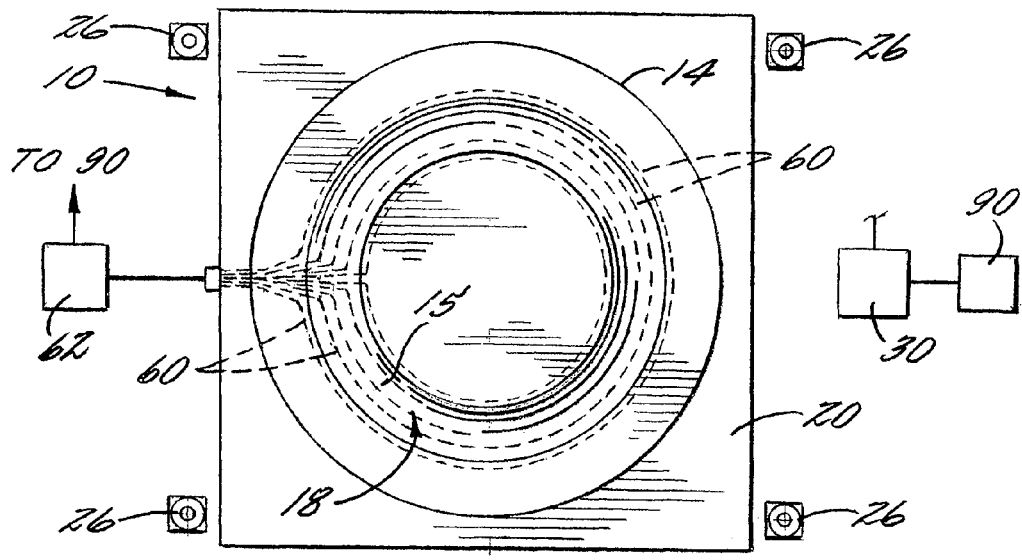
FIG. 2 is a plan view illustrating the system of FIG. 1 with the first die removed for purposes of illustrative clarity.

The die set 12 can be heated before or after the preform 40 is disposed in the die cavity 18. For example, the die set 12 can be disposed in an oven or other heating device before or after the preform 40 is loaded into the die cavity 18. Alternatively, the system 10 can include a heater, such as a heater that is integral to the die set 12. In this regard, as illustrated in FIGS. 1 and 2, the system 10 can include a plurality of electrically conductive elements 60, such as electrically resistive rods or wires that resistively heat when an electric current is passed through. Thus, the conductive elements 60 can be connected to an electrical power supply 62 and used to heat the preform 40 to a forming temperature in the die cavity 18.

As illustrated in FIG. 1, the preform 40 includes a skin member 42 and a support member 44. The skin member 42 is a contoured member, which typically a formed sheet that defines an outer surface of the assembly 70. The members 42, 44 of the preform 40 are typically flat before being formed to the desired shape of the structural assembly 70 of FIG. 8. Either or both of the members 42, 44 can be formed to various different shapes, though typically the skin member 42 is formed to define a desired contour of the structural assembly 70, and the support member 44 is formed to extend in a substantially direct configuration between opposing portions of the skin member 42 for supporting the skin member 42 in its contoured configuration. That is, although the support member 44 can be curved, the cross-sectional shape of the support member 44 as shown in FIG. 9 is straight between portions of an arc defined by the skin member 42. Thus, the support member 44 can provide strength and stiffness to the skin member 42 to support the skin member 42 in the desired configuration during use of the assembly 70.

Figure 3:
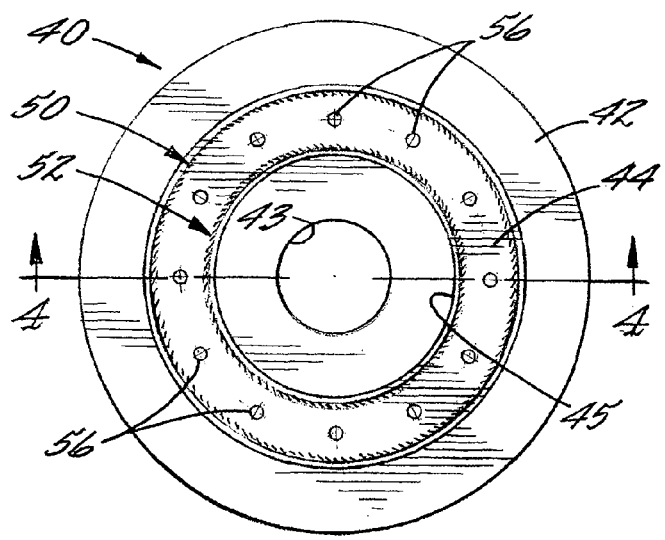
FIG. 3 is a plan view illustrating the preform of the system of FIG. 1.

The members 42, 44 of the preform 40 can define a shape that corresponds to the desired shape of the structural assembly 70. For example, as illustrated in FIG. 3, each member 42, 44 can be circular and can define a hole 43, 45 for forming the structural assembly 70 of FIG. 8. Further, the support member 42 can be connected to the skin member 42 so that the support member 44 is disposed in a predetermined configuration after the forming operation. For example, as shown in FIG. 9, the skin member 42 can be formed to first and second opposite sides 74, 76 with a space between the sides 74, 76, and the support member 44 can extend between the opposite sides 74, 76 to support the skin member 42 in the desired configuration. In particular, the skin member 42 can have a profile defining an arc, and the support member 44 in cross-section can define a chord within the arc, e.g., extending substantially linearly between two points on the arced skin member 42. In some cases, the position of the support member 44 relative to the skin member 42 in the preform 40 can be determined by analyzing the expected formation of the preform 40, including which portions of the members 42, 44 will be formed and the degree of formation that will occur throughout the members 42, 44. Such analysis can be performed using a computer, such as by using a computer program for conducting a finite element analysis of the preform 40 and the forming operation.

Figure 4:
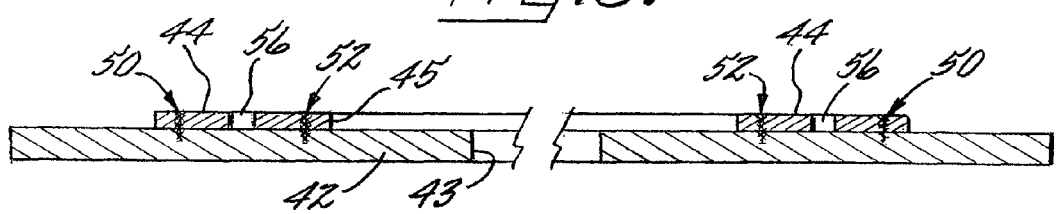
FIG. 4 is a section view illustrating the preform of FIG. 3 as seen along line 4-4 of FIG. 3.

The support member 44 is connected to the skin member 42 by joints 50, 52 so that the preform 40 defines a space 54 between the members 42, 44 and between the joints 50, 52. That is, as shown in FIGS. 3 and 4, first and second annular joints 50, 52 connect the members 42, 44. The first joint 50 is disposed at an outer periphery of the support member 44, and the second joint 52 is disposed at an inner periphery of the support member 44, radially within the first joint 50. Thus, the space 54 extends annularly between the members 42, 44 and between the joints 50, 52, with the joints 50, 52 being disposed at the outer and inner peripheries of the space 54, respectively. By the term "annular," it is meant that the space 54 extends around an axis or other central portion that is radially inward of the space 54, and each joint 50, 52 extends proximate a circumference of the space 54, i.e., with the first joint 50 radially inward of the space 54 and the second joint 52 radially outward of the space 54. The space 54 and the joints 50, 52 can define generally circular shapes, as shown in FIG. 3, or other shapes such as an ellipse, rectangle, or irregular polygon. In any case, each of the joints 50, 52 can include one or more weld connections. For example, each joint 50, 52 can include a pair of parallel weld connections, each of the individual weld connections being between about 0.003 inch and 0.004 inch wide and about 0.050 inch apart. The joints 50, 52 can be formed by various welding processes, including laser welding, friction stir welding or other types of friction welding, resistance welding, diffusion bonding, brazing, fusion welding, gas arc welding, and the like.

Diffusion bonding generally refers to a bonding operation in which the members to be bonded are heated to a temperature less than the melting temperature of each member and pressed in intimate contact to form a bond between the members. Brazing generally refers to a bonding operation in which a braze material is provided between the members that are to be joined, and the members and braze material are heated to a temperature higher than the melting temperature of the braze material but lower than the melting temperature of the members being joined. Thus, a diffusion bond can be formed between the members 42, 44 of the preform 40 by heating the members 42, 44 and urging them together with sufficient pressure at the desired locations of the joints 50, 52. A stop-off material can be provided for otherwise preventing bonding. Brazing can be performed similarly, but generally requires that an additional braze material be provided between the members 42, 44, e.g., at the interface of the members 42, 44 where the joints 50, 52 are to be formed. The braze material can be selectively provided where joints 50, 52 are to be formed. Diffusion bonding and brazing are further described in U.S. Pat. No. 5,420,400, entitled "Combined Inductive Heating Cycle for Sequential Forming the Brazing," which issued on May 30, 1995, which is assigned to the assignee of the present application, and the entirety of which is incorporated herein by reference.

Figure 5:
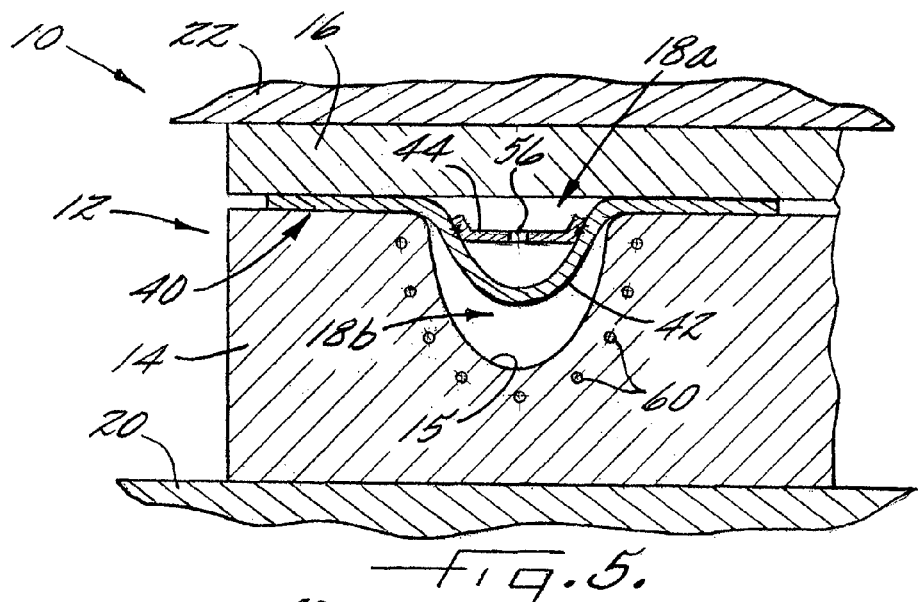
FIGS. 5-7 are partial section views illustrating the system of FIG. 1 during forming of the structural assembly according to one embodiment of the present invention.
Figure 6:
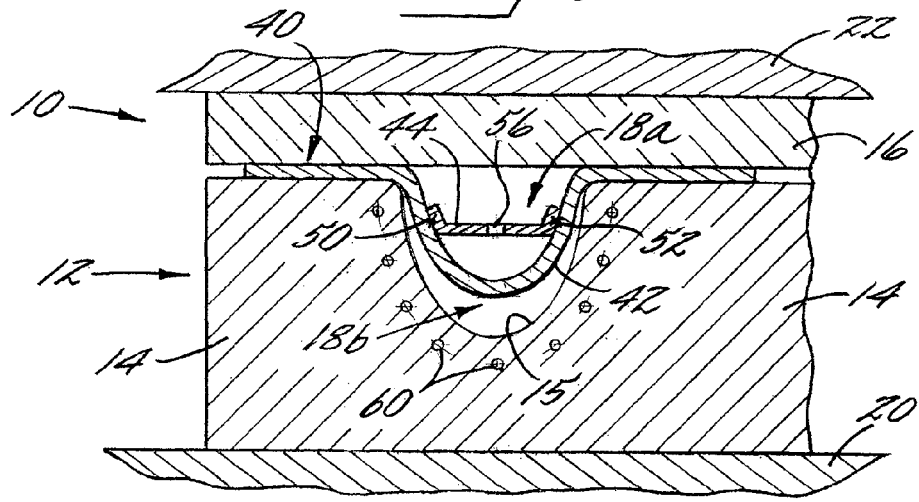
Figure 7:
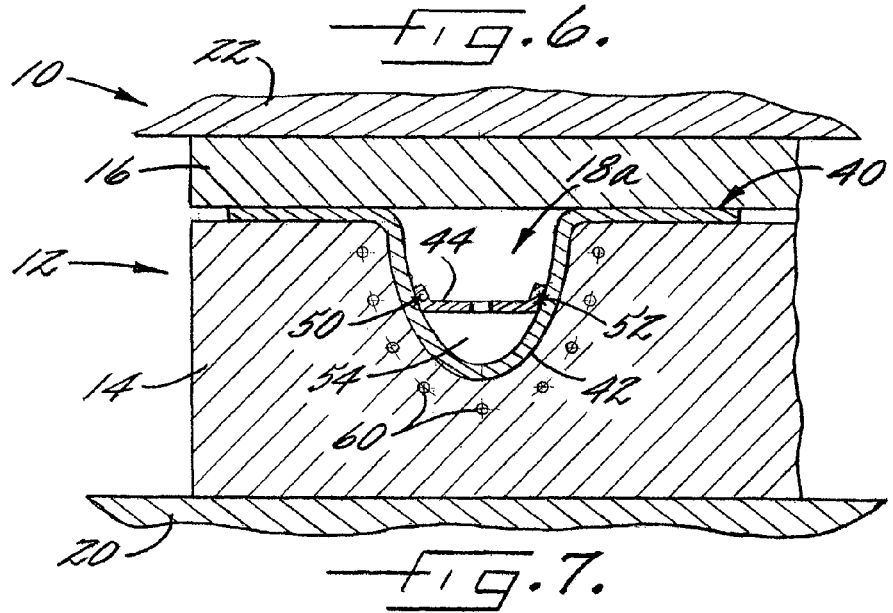

The support member 44 defines apertures 56, with the apertures 56 extending to the space 54 between the members 42, 44. The apertures 56 are configured to deliver fluid so that a pressurized fluid can be delivered through the support member 44 to form the skin member 42 to the desired contour. The forming process is illustrated in FIGS. 5-7. FIG. 5 illustrates the system 10 of FIG. 1, with the die set 12 adjusted to a closed position, and a preform 40 partially formed. That is, the pressurized fluid is delivered from the source 30 to a first portion 18a of the die cavity 18, i.e., between the second die 16 and the preform 40. One or more drain passages can be provided for releasing gas from a second portion 18b of the die cavity 18, i.e., between the first die 14 and the preform 40, as the preform 40 is formed toward the first die 14. It is appreciated that either portion 18a, 18b of the die cavity 18 and/or the space 54 can be substantially closed before or after the forming operation. That is, either portion 18a, 18b and/or the space 54 can have a volume that is substantially zero. For example, if the members 42, 44 of the preform 40 and the second die 16 are flat as shown in FIG. 1, the space 54 and the first portion 18a of the die cavity 18 can be substantially closed at the start of the forming operation and then expanded during the forming operation as shown in FIGS. 5-7. The second portion 18b of the die cavity 18 includes nearly all of the volume of the die cavity 18 before forming, and the volume of the second portion 18b is substantially zero after forming (FIG. 7).

As the pressurized fluid is delivered to the first portion 18a of the die cavity 18, the pressurized fluid flows through the apertures 56 of the support member 44 and urges the skin member 42 toward the first die 14. Thus, as shown in FIG. 6 and 7, the preform 40 is formed toward and against the first die 14. In this regard, the preform 40 is also typically heated before and/or during the forming operation. For example, the power supply 62 can be energized and used to deliver an electric current through the conductive members, thereby heating the members and the preform 40. The preform 40 can be heated to a forming temperature, such as the superplastic forming temperature of the material from which the preform 40 is made. In some cases, the power supply 62 can selectively heat the conductive members so that a particular distribution of heat is achieved in the preform 40, e.g., to heat the preform 40 substantially uniformly to the forming temperature. In this regard, thermocouples or other heat monitoring devices can be configured to measure the temperature of the preform 40 at various positions and communicate with the power supply 62 so that the power supply 62 can responsively increase the heating in those areas of the preform 40 that are cooler than desired and decrease the heating of those areas of the preform 40 that are hotter than desired.

The skin member 42 is typically superplastically formed, though in some cases other types of forming can be sufficient for achieving the desired shape. Superplastic forming ("SPF") generally refers to a process for forming plastics and metals, including titanium, aluminum, and alloys thereof, that exhibit superplastic behavior at certain temperatures, i.e., large elongations (up to about 2,000 percent). The conventional SPF process can be used for forming a single SPF sheet or an SPF pack that includes multiple layered sheets. During the SPF process, the SPF sheet or pack is placed into a shaping die and heated to a sufficiently high temperature within the superplasticity range of the material to soften the material. Pressurized gas is then injected against the material, and possibly into the pack if applicable, thereby causing the sheet or pack to be urged against the die. In some cases, contacting portions of the one or more sheets of material are joined through brazing or diffusion bonding. The formed sheet or pack is then cooled and removed from the die and final machining steps are performed, such as edge trimming. Advantageously, the SPF process can be used to form structures that can satisfy narrow shape and tolerance requirements without substantial additional machining. Such SPF and combined SPF-bonding cycles are described in U.S. Pat. No. 4,117,970, entitled "Method for Fabrication of Honeycomb Structures," which issued on Oct. 3, 1978; U.S. Pat. No. 5,410,132, entitled "Superplastic Forming Using Induction Heating," which issued on Apr. 25, 1995; U.S. Pat. No. 5,700,995, entitled "Superplastically Formed Part," which issued on Dec. 23, 1997; U.S. Pat. No. 5,705,794, entitled "Combined Heating Cycles to Improve Efficiency in Inductive Heating Operations," which issued on Jan. 6, 1998; U.S. Pat. No. 5,914,064, entitled "Combined Cycle for Forming and Annealing" which issued on Jun. 22, 1999; and U.S. Pat. No. 6,337,471, entitled "Combined Superplastic Forming and Adhesive Bonding" which issued on Jan. 8, 2002, each of which is assigned to the assignee of the present invention, and the entirety of each of which is incorporated herein by reference. In some cases, superplastic forming can affect the properties of the materials so formed. Thus, a member that is superplastically formed to a desired shape from a flat or other configuration can have material properties distinct from those of a member that is machined or otherwise formed to the same desired shape.

Alternatively, the members 42, 44 can be formed by other conventional forming processes. However, it is appreciated that superplastic forming can produce shapes that are difficult or impossible to form using some other forming techniques. In particular, the members 42, 44 can define deeply contoured curves, such as is illustrated in FIG. 7-9, which may be difficult or impossible to form by other forming operations. In some embodiments of the present invention, the skin member 42 can be elongated by 50% or more. For example, in one embodiment of the present invention, the skin member 42 can have an original thickness of about 0.080 inch in the preform 40, and the thickness of at least a portion of the skin member 42 can be reduced to about 0.040 inch or less during the forming operation.

The members 42, 44 can be formed of various materials including, but not limited to, titanium, aluminum, alloys that include titanium or aluminum, and the like. Further, the members 42, 44 can be formed of similar or dissimilar materials. For example, according to one embodiment of the present invention, one or both of the members 42, 44 can each be formed of Ti-6Al-4V, Ti-3Al-2.5V, or the like. The particular materials to be used for each member 42, 44 can be selected to facilitate the manufacture of the assembly 70 and to provide in the finished assembly 70 the desired material properties and characteristics including strength, corrosion resistance, and the like. For example, the material(s) to be used for forming each member 42, 44 can be selected according to the expected loads, operating temperatures, and other conditions. Each member 42, 44 can be a single, unitary component, or one or both of the members 42, 44 can be provided by joining multiple pieces of material.

While the skin member 42 can be formed to the desired shape of the structural assembly 70, the support member 44 typically is formed to a configuration for extending substantially directly, i.e., substantially linearly, between the joints 50, 52 connecting the support member 44 to the skin member 42. That is, as shown in FIG. 9, the support member 44 can be bent proximate to the joints 50, 52 so that the support member 44 extends in a substantially direct configuration between opposed portions of the skin member 42, i.e., to define a chord between portions of an arc defined by the skin member 42. The support member 44 can also be superplastically formed, or otherwise formed, in conjunction with the forming of the skin member 42. For example, the support member 44 can be stretched between the joints 50, 52. In some cases, the support member 44 can be stretched by 50% or more. However, in some cases, excessive stretching of the support member 44 can result in mark-off of the skin member 42, i.e., wrinkling or groove formation in the skin member 42 opposite the support member 44. Also, excessive stretching of the support member 44 can sometimes result in enlargement of cavities, nuggets, or other features in the skin member 42, such as are typically formed during laser welding of the support member 44 to the skin member 42 to form the joints 50, 52. Therefore, in some embodiments of the present invention, the support member 44 is typically stretched by about 5%-20% true strain during the forming operation.

According to one method of the present invention, the preform 40 is assembled as described above, such that the skin member 42 and support member 44 are connected by the joints 50, 52. The preform 40 is placed in the die cavity 18, and the die set 12 is adjusted to a closed position so that the skin member 42 disposed partially against the first die 14 and the support member 44 is disposed between the skin member 42 and the second die 16. In some cases, a parting agent such as boron nitride can be coated on the outer surfaces of the members 42, 44 and/or the inner surfaces of the dies 14, 16. The first die 14 typically defines a contour surface 15 that corresponds to the desired shape of the structural assembly 70. The second die 16 can be a substantially planar member. Alternatively, the second die 16 can define a contour that corresponds to the shape of the preform 40 in a partially formed configuration. Thus, upon closing of the dies 14, 16, the second die 16 can contact the preform 40 and bend the preform 40 to partially form the preform 40 to the desired contour.

The dies 14, 16 are secured in this position, e.g., by urging the two dies 14, 16 together with the actuators 26 or otherwise securing the dies 14, 16. The die set 12 and/or the preform 40 can be heated before or after the preform 40 is disposed in the die set 12. In particular, the preform 40 can be heated to a temperature at which superplastic forming of at least the skin member 42 can be performed. For example, the die set 12 can be heated in a furnace or hot press before or after the preform 40 is placed in the die set 12, or the preform 40 can be heated using the conductive elements 60 that are integral to the die set 12. Alternatively, the preform 40 can be heated by providing an electromagnetic field that induces an electric current in the preform 40 or in a separate susceptor member disposed in thermal communication with the preform 40. The use of such susceptors for heating preforms in a die is further described in U.S. Pat. Nos. 5,705,794; 5,914,064; and 6,337,471, noted above. In any case, the temperature to which the preform 40 is heated can be determined according to the type of material of the preform 40, the type of bonding to be performed, and the like. For example, titanium typically can be superplastically formed and diffusion bonded at a temperature of between about 1425° and 1725° F. For other materials and other forming and bonding operations, a higher or lower temperature can be provided.

With the die set 12 adjusted to the closed position, and the first portion 18a of the die cavity 18 sealed between the skin member 42 and the second die 16, the pressurized fluid is configured to deliver the pressurized fluid to die cavity 18. In some cases, the gas in the die cavity 18 around the preform 40 is first purged by repeatedly vacuuming gas and refilling the die cavity 18 with an inert gas such as argon to prevent high temperature oxidation, i.e., formation of a brittle alpha case titanium layer. Thereafter, the pressurized fluid delivered to the first portion 18a of the die cavity 18 urges the skin member 42 against the contour surface 15 of the first die 14. Thus, the members 42, 44 are formed, i.e., so that the skin member 40 is formed to the desired contour of the structural assembly 70 and so that the support member 44 is positioned as desired in the assembly 70 and/or stretched to the desired length between the joints 50, 52 with the skin member 40.

For example, a controller 90, such as a computer, programmable logic device, or other processor, can be provided for controlling the bonding operation. In particular, the controller 90 can be configured to communicate electrically with the pressurized fluid source 30 to control the pressure in the die cavity 18.

After forming and/or bonding, the preform 40 can be removed from the die cavity 18, typically after the preform 40 is at least partially cooled in the die set 12 to prevent distortion of the preform 40 during or after removal. Depending on the material of the preform 40, it may be possible to remove the preform 40 with little cooling. Regardless of whether the preform 40 is cooled in or out of the die cavity 18, the rate of cooling of the preform 40 can be controlled. For example, the system 10 can include a device for cooling the dies 12, 14 and, hence, the preform 40, such as a pump for circulating a coolant fluid through passages defined by the dies 14, 16. Such a cooling operation is described, e.g., in U.S. Pat. No. 6,528,771, noted above. If the preform 40 is removed from the die set 12 while hot, the preform 40 can be insulated to limit the rate of cooling. Alternatively, the rate of convective cooling of the preform 40 can be increased by inducing air circulation proximate the preform 40.

The preform 40 can also be machined or otherwise trimmed to the desired configuration of the structural assembly 70. In particular, the edges of the members 42, 44 can be trimmed from the preform 40. In some cases, the structural assembly 70 can also be further assembled with other similar structural assemblies. For example, as noted above, the structural assembly 70 illustrated in FIG. 8 is an inlet of a nacelle 80, or housing, for an aircraft engine. That is, the structural assembly 70 can be connected to the rest of the nacelle 80 so that the structural assembly 70 provides a smooth, annularly-extending inlet, with the skin member 42 defining a portion of an outer mold line of the nacelle 80. The support member 44 is disposed within the skin member 42 and provides a bulkhead or other support feature. For example, as illustrated in FIG. 9, the support member 44 can be a bulkhead in the curved skin member 42. In some cases, the apertures 56 can be used during operation of the structural assembly 70, e.g., to deliver a fluid. For example, a gas can be circulated through the apertures in connection with a thermal operation for preventing or removing ice build-up on the structural assembly 70.

The connection between the structural assembly 70 and the rest of the nacelle 80 can provide a smooth, continuous outer mold line surface, to promote laminar flow of air around the nacelle and to generally minimize turbulence of the air. In particular, the structural assembly 70 can be formed of titanium or another metal, the rest of the nacelle can be formed of a composite material, such as a graphite/epoxy composite, and the structural assembly 70 can be joined using sol-gel chemistry. That is, the surface of the structural assembly 70 can be prepared for bonding by producing a film on the surface using a solution-gelation (sol-gel) material and method, i.e., using a colloidal suspension of silica particles that is gelled to form a solid, so that a composite material can be bonded to the structural assembly 70 without requiring mechanical fasteners.

In some cases, a cellular core can be disposed within the inlet defined by the structural assembly 70, i.e., developing a sinusoidal-pattern integral bulkhead between the opposite sides 74, 76 of the skin member 42, or otherwise within the nacelle 80 to increase acoustic insulation, increase structural stiffness, and/or for transmitting and directing hot gas to reduce ice formation on the inlet, as described in U.S. Pat. Nos. 6,371,411 and 6,457,676, both of which are assigned to the assignee of the present invention, and the entirety of each of which is incorporated herein by reference.

In other embodiments of the present invention, the structural assemblies can be formed to other desired contours and used in other applications. For example, the structural assembly can be formed to the shape of at least a portion of an airfoil, such as a wing, horizontal stabilizer, aircraft rudder, missile fin, helicopter blade, automobile spoiler, submarine or boat rudder, jet engine, turbine fan blade, or the like. In this regard, it is noted that a straight or arced structural assembly with a cross-section of the assembly 70 illustrated in FIG. 9 can be used to define the leading edge of an airfoil, such as the wing 82 illustrated in FIG. 8. Thus, the structural assembly of the present invention can be formed with the space 54 between the members 42, 44 extending substantially linearly or along an arc, and the structural assembly can be used to form the leading edge of the wing or other airfoil.

As described above in connection with FIGS. 1 and 5-7, the contour surface 15 is defined by the first die 14, and the skin member 42 is urged downwards as illustrated toward the contour surface 15 during forming. According to other embodiments of the present invention, the second die 16 can also define a contour surface so that two preforms 40 can be simultaneously formed in the system 10. That is, a first preform 40 can be formed against the first die 14, and a second preform 40 can be formed against the second die 16. In this regard, the pressurized fluid can be provided between the two preforms 40 so that the gas flows through the apertures 56 of the support members 44 and urges each of the skin members 42 of the preforms 40 against the respective dies 14, 16. Thereafter, each of the preforms 40 can be removed from the die cavity 18, and each can be used to form one of the structural assemblies 70. In other embodiments, any number of structural assemblies can be formed from a single preform 40. In some cases, the combined manufacture of multiple structural assemblies can reduce the average time and/or energy required for forming each structural assembly 70.

Figure 10:
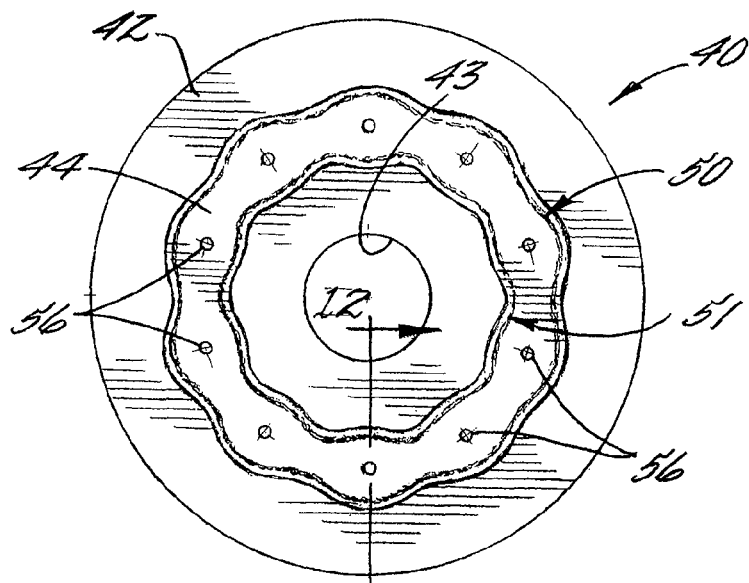
FIG. 10 is a plan view illustrating a preform for forming a structural assembly according to another embodiment of the present invention.
Figure 11:
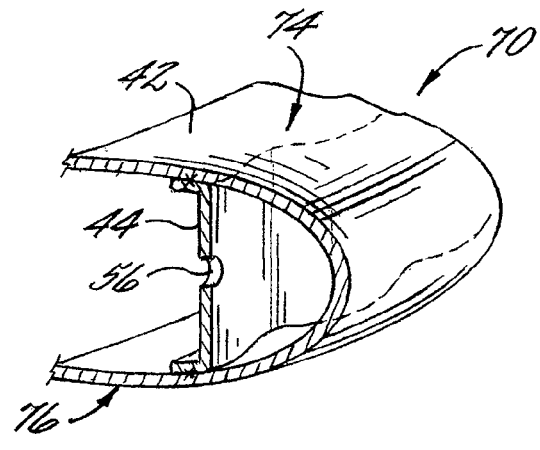
FIG. 11 is a partial perspective view illustrating a structural assembly formed from the preform of FIG. 10.

The joints and/or the edges of the support member 44 can define a uniform curve, i.e., a circle, as shown in FIG. 3, or the joints and/or edges can define a nonuniform curve. For example, as illustrated in FIGS. 10 and 11, the joints and/or the edges of the support member 44 can define a sinusoidal pattern, i.e., a pattern defining a succession of waves or curve. A sinusoidal or otherwise nonuniform pattern of the joints 50, 52 can provide an increased strength and stiffness in the structural assembly 70. In addition, such a configuration can affect the vibratory characteristics of the assembly 70, such that vibrations in the assembly 70 during use are reduced.

Figure 12:
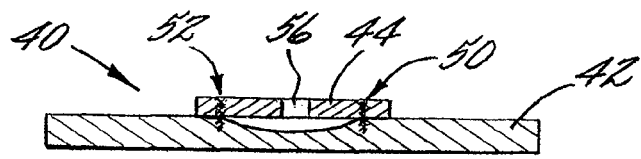
FIG. 12 is a section view illustrating the preform of FIG. 10 as seen along line 12-12 of FIG. 10.

In addition, while the thickness of each member 42, 44 is shown to be substantially uniform in FIG. 4, it is appreciated that each member can define a nonuniform thickness. In particular, the thickness of the skin member 42 and/or the support member 44 can be reduced in predetermined locations to increase the amount of elongation that occurs in those locations during forming. For example, as shown in FIG. 12, the thickness of the skin member 42 can be reduced between the joints 50, 52 to increase the elongation of the skin member 42 between the joints 50, 52, and possibly reduce wrinkles or otherwise undesired features from forming. Further, the thickness of the members 42, 44 can be reduced to affect the final location and configuration of the support member 44 relative to the skin member 42 in the resulting structural assembly 70. Various methods can be used for changing the thickness of the members 42, 44. For example, the thickness of either member can be reduced by subjecting the member to a chemical milling operation in which at least a portion of the respective member is exposed to a chemical for dissolving or otherwise removing material.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed, they are used in a generic and descriptive sense only and not for purposes of limitation.

What is claimed is:

1. A nacelle assembly, comprising:
    an inlet of a nacelle comprising a structural assembly, wherein the structural assembly comprises:
        a skin member;
        a support member joined to the skin member by first and second annular joints such that the skin member and the support member define an annular space, the first joint extending annularly proximate to an outer periphery of the annular space and the second joint extending annularly proximate to an inner periphery of the annular space,
        wherein the support member extends in a substantially direct configuration between opposing portions of the skin member such that the annular space is defined between the skin and support members and between the first and second joints, and the support member defines a plurality of apertures extending through the support member to the annular space; and
        a film comprised of a sol-gel material disposed on at least a portion of a surface of the skin member; and
    a remainder of the nacelle bonded to the inlet,
    wherein the film of the sol-gel material is disposed on that portion of the inlet that is bonded to the remainder of the nacelle in order to join the inlet and the remainder of the nacelle.

2. A nacelle assembly according to claim 1 wherein the skin member is superplastically formed from a flat configuration.

3. A nacelle assembly according to claim 1 wherein each of the first and second joints comprises at least one of the group consisting of a laser weld joint, a friction stir weld joint, a resistance weld joint, and a diffusion bond joint.

4. A nacelle assembly according to claim 1 wherein the support member defines a bulkhead within the inlet.

5. A nacelle assembly according to claim 1 wherein at least one of the joints defines a sinusoidal pattern.

6. A nacelle assembly according to claim 1 wherein at least one of the skin and support members comprises titanium, and wherein the remainder of the nacelle comprises a composite material.

7. A nacelle assembly according to claim 1 wherein each of the skin and support members is a unitary member.

8. A nacelle assembly according to claim 1 wherein the skin and support members comprise different titanium alloys.

9. A nacelle assembly according to claim 1 wherein the skin member defines a nonuniform thickness with that portion of the skin member that extends between the first and second joints being thinner than that portion of the skin member that does not extend between the first and second joints.

10. A nacelle assembly according to claim 1 wherein the inlet is bonded to the remainder of the nacelle independent of any mechanical fasteners.

* * * * *